United States Patent [19]

Poimboeuf et al.

[11] Patent Number: 5,351,092
[45] Date of Patent: Sep. 27, 1994

[54] SYNCHRONIZATION OF DIGITAL AUDIO WITH DIGITAL VIDEO

[75] Inventors: Michael Poimboeuf, Vacaville; Kevin D. Windrem, Grass Valley, both of Calif.

[73] Assignee: The Grass Valley Group, Inc., Nevada City, Calif.

[21] Appl. No.: 96,356

[22] Filed: Jul. 23, 1993

[51] Int. Cl.$^5$ ............................................. H04N 5/04
[52] U.S. Cl. .................... 348/512; 348/515; 358/341; 360/19.1
[58] Field of Search ............... 358/143, 144, 145, 142, 358/141, 12, 146, 148, 149, 158, 198, 341, 335; 360/19.1, 36.1, 37.1, 36.2; 348/484, 485, 500, 512, 513, 514, 515, 517, 462, 463, 464; H04N 7/04, 5/04, 5/06

[56] References Cited

U.S. PATENT DOCUMENTS

| | | | |
|---|---|---|---|
| 4,233,627 | 11/1980 | Sugihara | 358/143 |
| 4,825,303 | 4/1989 | Yablonski et al. | 358/341 |
| 4,851,909 | 7/1989 | Noske et al. | 358/149 |
| 4,855,827 | 8/1989 | Best | 358/143 |
| 4,928,185 | 5/1990 | Kobayashi et al. | 360/19.1 |
| 4,937,686 | 6/1990 | Arai et al. | 360/32 |
| 4,953,168 | 3/1990 | Odaka | 358/343 |
| 5,043,830 | 8/1991 | Nobuhiro | 360/19.1 |
| 5,101,274 | 3/1992 | Yoshimura et al. | 358/143 |

Primary Examiner—James J. Groody
Assistant Examiner—Michael H. Lee
Attorney, Agent, or Firm—Francis I. Gray

[57] ABSTRACT

A method for synchronization of a digital audio signal sampled at a standard audio frequency with the corresponding digital video signal sampled at a standard video frequency associates an integer number of samples of the digital audio signal with each video field of the digital video signal. The number of audio samples per video field is determined by the audio sample rate rounded up to the nearest integer. Every N video fields where the number of digital audio samples is an integer value, the digital audio signal is resynchronized with the digital video signal by repeating the digital audio samples at the end of video field N that correspond to video field N+1. At reception the same digital audio samples are skipped at the end of video field N.

4 Claims, 2 Drawing Sheets

| 525/60 VIDEO FIELD # | AUDIO SAMPLE RATES | | |
|---|---|---|---|
| | f=48K | f=44.1K | f=32K |
| 1 | 800.8 | 735.735 | 533.867 |
| 2 | 1601.6 | 1471.470 | 1067.733 |
| 3 | 2402.4 | 2207.205 | 1601.6 |
| 4 | 3203.2 | 2942.940 | 2135.467 |
| 5 (mfd48) | 4004 (msq48) | 3678.675 | 2669.333 |
| 6 | 4804.8 | 4414.410 | 3203.2 |
| ... | ... | ... | ... |
| 14 | 11211.2 | 10300.290 | 7474.133 |
| 15 (mfd32) | 12012 | 11036.025 | 8008 (msq32) |
| 16 | 12812.8 | 11771.760 | 8541.867 |
| ... | ... | ... | ... |
| 199 | 159359.2 | 146411.265 | 106239.467 |
| 200 (mfd44.1) | 160160 | 147147 (msq44.1) | 106773.333 |

Fig.1

SYNCHRONIZATION OF DIGITAL AUDIO WITH DIGITAL VIDEO

BACKGROUND OF THE INVENTION

The present invention relates to synchronization of signals, and more particularly to synchronization of digital audio with digital video for video field accurate recording on a digital disk video recorder.

There exists an audio/video synchronization problem that is caused by the actual one part per thousand, i.e., 60.0 Hz * 1000/1001=59.94 Hz, fractional sample rate offset of 525/60 video relative to its nominal 60 Hz field rate. Thus there are a fractional number of 32 kHz, 44.1 kHz or 48 kHz audio samples, i.e., 533.867, 735.735 and 800.8 respectively, in the time span of one video field. The smallest number of video fields which contain an integer number of audio samples for these rates, or the minimum field denominator (mfd), is shown in the Table of FIG. 1, i.e., 15 fields for 32 kHz yielding 8008 samples, 200 fields for 44.1 kHz yielding 147147 samples, and 5 fields for 48 kHz yielding 4004 samples. These minimum number of samples represent a minimum sample quotient (msq) for each respective field denominator.

Prior methods for solving this problem have relied upon one of two methods:

1. Reducing the audio sample rate by one part per thousand, rounding up the published rate, i.e., by publishing enough significant digits to show the error, and calling that rate "synchronized to video." Thus 44.056 . . . kHz becomes "44.1 kHz synchronized to video" and 47.952 . . . kHz becomes "48 kHz synchronized to video." This approach is misleading to the consumer and incompatible with ANSI standard sample rates.

2. Blocking the audio data into unequal blocks of audio. Digital video tape recorders format data into a five frame, i.e., ten field, sequence using multiple, unequal audio blocks of 160 and 161 samples. This unequal block format also requires a separate linear control track containing the frame sequence, and is suboptimal for field-based digital disk recording.

What is desired is a process for synchronization of digital audio with digital video that does not restrict the sample rate or rely upon unequal block formatting so that any sample rate that yields a rational and sufficiently small "mfd" and resultant "msq" may be accommodated.

SUMMARY OF THE INVENTION

Accordingly the present invention provides for synchronization of digital audio with digital video by using memory buffering combined with synchronization address generators and sample stuffing so that a constant number of audio samples per video field is provided. The audio samples are synchronized to a minimum field denominator, mfd, and allowed to remain asynchronous in between, i.e., the audio/video field boundary is allowed to drift between mfd fields. The field address of each audio sample is decoded from its position in the video field address sequence, and may optionally be further resolved using sample addresses that correspond to absolute sample positions within that field sequence with the resolution being determined by the size of a minimum sample quotient, msq. The number of audio samples per field is maintained constant using "sample-stuttering", a form of sample-stuffing. On playback "stuttered" samples are "skipped", resulting in re-synchronization at the skip boundaries and exact re-synchronization at the mfd boundaries. FIFO memories coupled to a data bus are used for memory buffering. Programmed logic devices are used for "stuttering" and "skipping" and interface between a mass storage device and the data bus. The entire process may be controlled by a microprocessor also coupled to the data bus.

The objects, advantages and other novel features of the present invention are apparent from the following detailed description when read in conjunction with the appended claims and attached drawing.

BRIEF DESCRIPTION OF THE DRAWING

FIG. 1 is a table illustrating audio/video sample ratios for preferred audio sample rates versus 525/60 video line rate.

DESCRIPTION OF THE PREFERRED EMBODIMENT

The number of audio samples per video field are synchronized to a minimum field denominator, mfd, as defined above with reference to the Table of FIG. 1. The number of audio samples per video field is maintained constant using a stutter/skip synchronization technique. This technique is a form of sample-stuffing while recording and sample-skipping when playing back. The number of audio samples per video field, Nv, is proportional to the minimum sample quotient, msq, divided by mfd and is given by:

$$Nv = Ceiling(msq/mfd)$$

where Ceiling(x) means to round "x" up to the next highest integer. For instance in the case of a 48 kHz sample rate, which yields an mfd of 5 and an msq of 4004, Ceiling(4004/5)=Ceiling(800.8)=801.

The number of stuttered samples, Ns, is given by:

$$Ns = (Nv * mfd) - msq.$$

Figure 2:
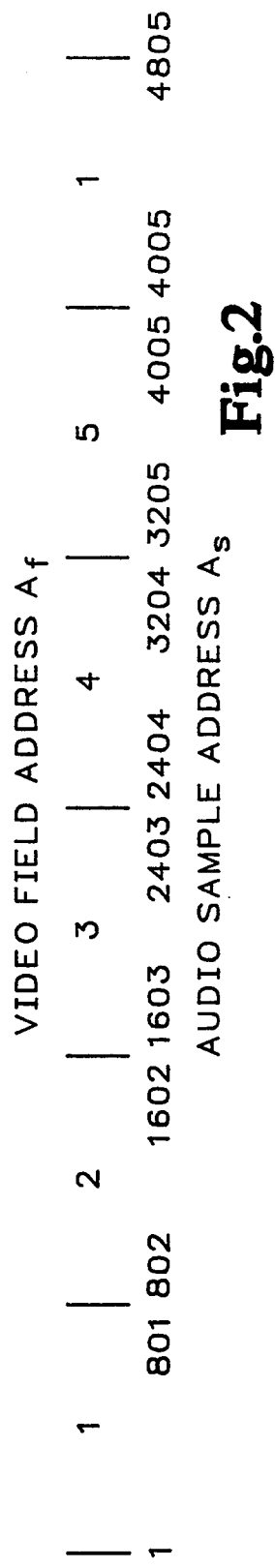
FIG. 2 is a sequence block diagram illustrating the synchronization of digital audio with digital video according to the present invention.

For Nv=801, mfd=5 and msq=4004, Ns=801*5-4004=4005-4004=1, i.e., one stuttered sample every five fields. A diagram of the audio/video sequence for a 48.000 kHz audio sample rate is shown in FIG. 2, with the audio samples being stuttered at the video field Af=5 versus Af=1 transition so that audio sample As=4005 at the end of Af=5 is duplicated in the following video field Af=1. On playback As=4005 in Af=5 is skipped and As=4005 from the following Af=1 is played back. As=4005 in Af=5 is played back only if Af=5 is played back without a following Af=1 or Af=5 is copied to another location.

The excess channel bandwidth required is dependent upon the number of stuttered samples and the additional address data, and is given by:

$$d(BW) = [(Ns + (1 + Af/q) * mfd + (-1 + As/q) * msq)/msq]$$

where Af/q and As/q are the field and sample address data size, respectively, normalized by the audio quantization size, q, in bits. The sample address data may also contain sample block markers from the 192 frame channel block structure defined by the ANSI-S40.40-1992 standard, in which case As is simply increased by one bit.

In this implementation the maximum asynchronicity, or drift, between audio and video is 0.8 of an audio sample, or 16⅔ us. This asynchronicity is resynchronized, i.e., the "slack" is taken up, every five video fields on mfd boundaries. This re-synchronization occurs internal to the hardware, described below, and does not cause any frequency modulation, jitter or "flutter." This stutter/skip process is easily compatible with the 625/50 video format, or non-standard audio sample rates locked to video, none of which require any additional synchronization. A simple approach to maintain compatibility between 525/60 versus 625/50 video standards, or other rates that do not require additional synchronization, is to use a video field address count that starts at one instead of zero. Zero is treated as a null pointer address that shuts down the additional synchronization. Synchronization field address counts for the 48 kHz sample rates and 525/60 then run from one to five inclusive. In the case where the Af field address count is set to zero and synchronization is shut down, such as 625/50, the audio sample address As may still be used for extra data, such as ANSI-S4.40-1992 channel data, parity or error control bits.

Figure 3:
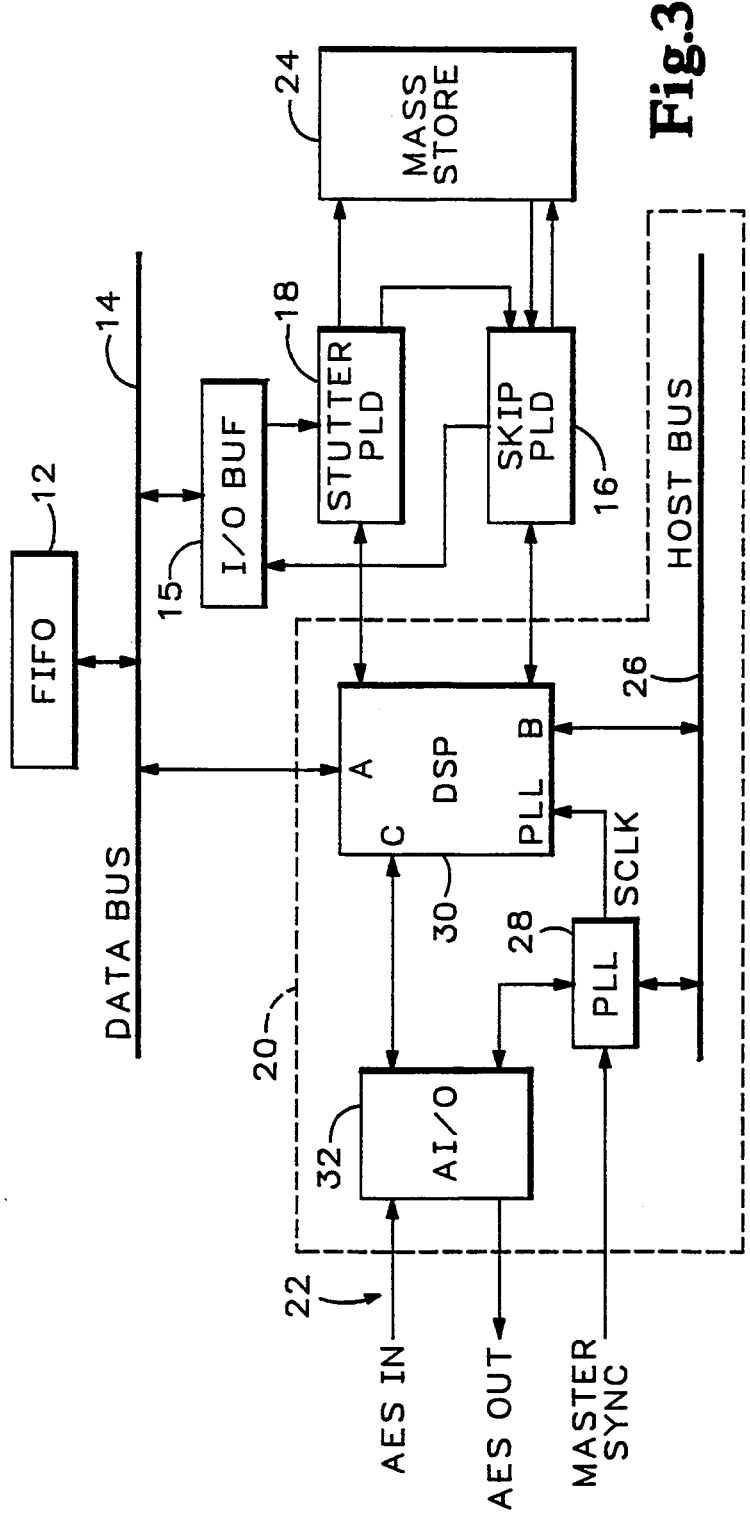
FIG. 3 is a block diagram of a system for implementing the synchronization of digital audio with digital video according to the present invention.

Referring now to FIG. 3 a first-in/first-out (FIFO) memory 12 is shown coupled to a data bus 14. The FIFO 12 is an optional buffer used to hold audio samples for sample rate synchronization, timebase correction and audio vs. video pre/post delay, i.e., to compensate for differential processing delays between audio and video. The FIFO 12 may be a dedicated RAM or may be contained within a processor memory. Also coupled to the data bus 14 via an input/output buffer 15 is a skip programmed logic device (PLD) 16 and a stutter PLD 18. The programmed logic devices 16, 18 may be expanded to include processor functions. Otherwise a processor 20 also is coupled to the data bus 14 and communicates with the outside world over an input/output (I/O) bus 22. In this embodiment a mass storage device 24 is coupled to receive audio/video data for recording from the stutter PLD 18 and to transmit audio/video data for playing back to the skip PLD 16. The mass storage device 24 may be disk or other random access memory (RAM) storage devices.

For this particular embodiment the processor 20 has a control processor (not shown) that is coupled via a host bus 26 to a phase locked loop (PLL) 28 and a digital signal processor (DSP) 30. An audio transceiver (AI/O) 32 is coupled between the I/O bus 22 and the DSP 30 to decode the AlES audio input signal into respective channels A and B, and to encode respective channels A and B into the AlES audio output signal. Timing for the AI/O 32 is provided by the PLL 28 which is synchronized to a master sync signal related to the digital video signal. The PLL 28 also provides a sample clock SCLK to the DSP 30.

Field address information, i.e., the current field from 1 to mfd, is contained in a data preamble, and partial sample address information related to the msq and including ANSI-S4.40-1992 192 frame block sync and redundant stutter and 525 mode bits, is contained in frame words written with every sample. The processor 20 writes to the stutter PLD 18 and reads from the skip PLD 16. Error control is implemented by monitoring status from the skip PLD 16, which monitors the address information, parity and validity bits. Format control is required for "Insert-Edit" type processing.

The recorded format simply has the current field address. If new data is to be merged with old data which is already recorded in the mass storage 24, the current field address is used to establish the stutter/skip sequence for the new data so that the new sequence matches the old. This is accomplished by forcing the stutter PLD 16 to match the current sequence. In one particular implementation the processor 20 passes the field address on from the skip PLD 16 to the stutter PLD 18, along with a control bit that forces the stutter PLD to start the sequence from that address. Even though, as indicated above, the processor 20 may not be required, using the processor to pass the format data through allows additional control, reliability, flexibility and improves testability.

Thus the present invention provides synchronization of digital audio with digital video by using a stutter/skip technique that maintains the number of audio samples per video field constant while re-synchronizing at every mfd field boundary.

What is claimed is:

1. A method of synchronizing a digital audio signal with a corresponding digital video signal comprising the steps of:

associating for transmission an integer number of samples of the digital audio signal obtained at an audio sample rate with each video field of the digital video signal, the number of digital audio samples per video field being determined by the audio sample rate and duration of each video field rounded up to the nearest integer; and for each N video fields, where N is the number of video fields for which there is an integer number of digital audio samples as a function of the audio sample rate, resynchronizing the digital audio signal with the digital video signal by repeating the digital audio samples at the end of the Nth video field that correspond to the digital audio samples at the beginning of the N+1st video field.

2. A method as recited in claim I further comprising the steps of skipping for reception the digital audio samples at the end of the Nth video field that correspond to the digital audio samples at the beginning of the N+1st video field.

3. An apparatus for synchronizing a digital audio signal with a corresponding digital video signal comprising:

means for associating for transmission an integer number of samples of the digital audio signal obtained at an audio sample rate with each video field of the digital video signal, the number of digital audio samples per video field being determined by the audio sample rate and duration of each video field rounded up to the nearest integer; and for each N video fields, where N is the number of video fields for which there is an integer number of digital audio samples as a function of the audio sample rate, means for resynchronizing the digital audio signal with the digital video signal by repeating the digital audio samples at the end of the Nth video field that correspond to the digital audio samples at the beginning of the N+1st video field.

4. An apparatus as recited in claim 3 further comprising means for skipping for reception the digital audio samples at the end of the Nth video field that correspond to the digital audio samples at the beginning of the N+1st video field.

* * * * *